UNITED STATES PATENT OFFICE.

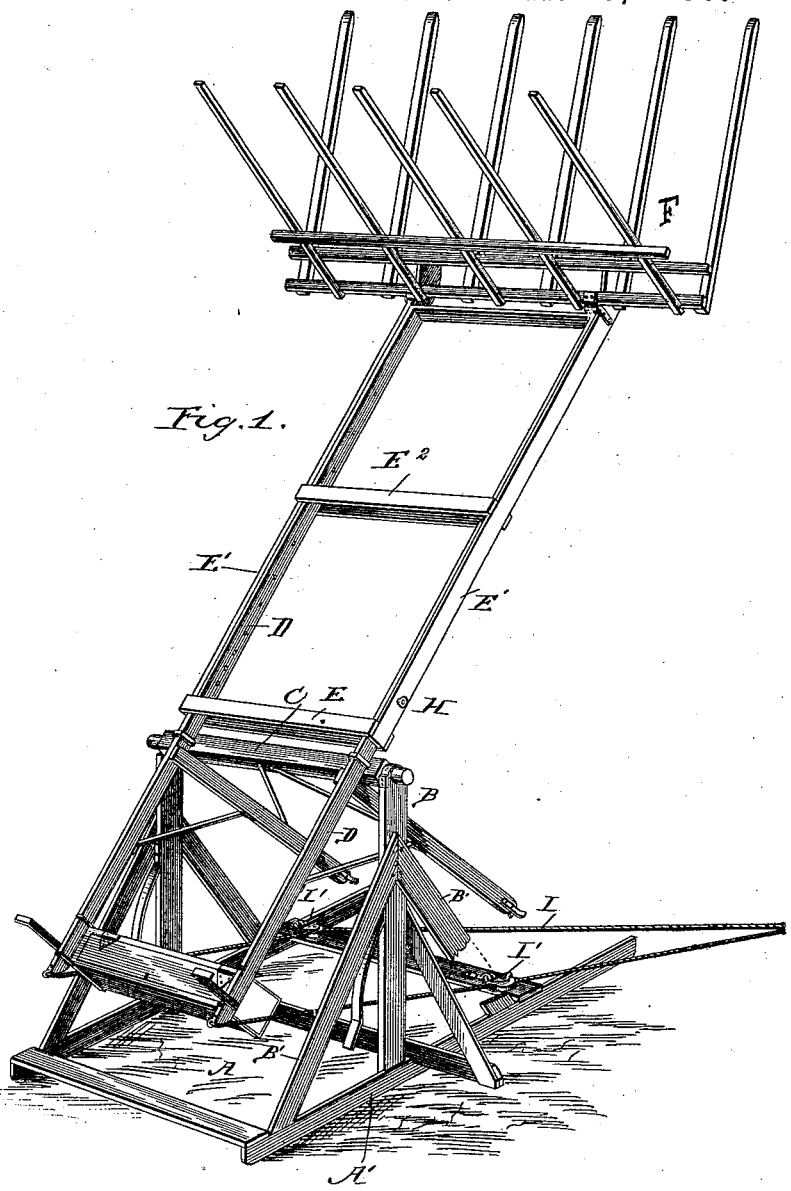

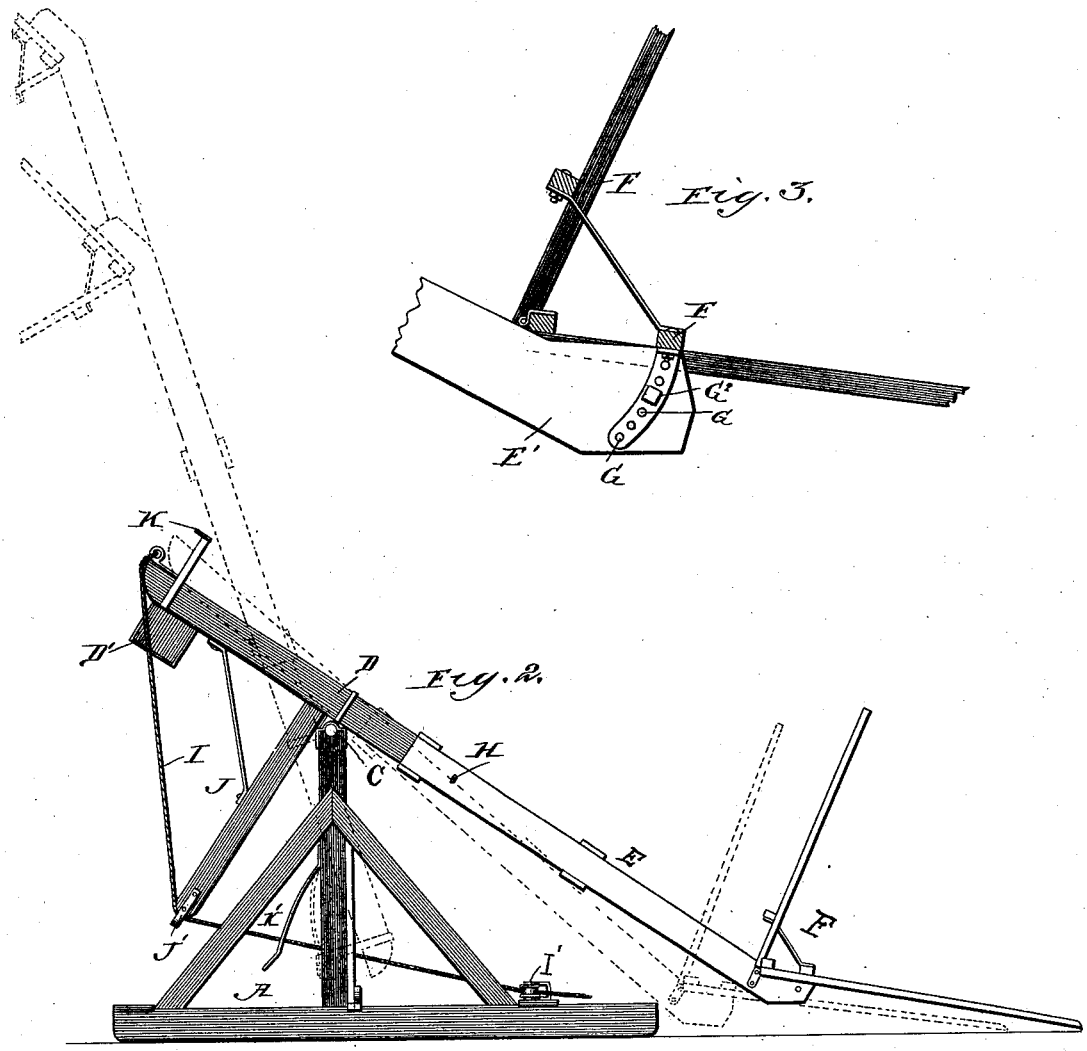

CHARLES W. POST, OF SPRINGFIELD, ILLINOIS.

HAY-STACKER.

SPECIFICATION forming part of Letters Patent No. 424,128, dated March 25, 1890.

Application filed July 2, 1886. Serial No. 206,988. (No model.)

*To all whom it may concern:*

Be it known that I, CHARLES W. POST, a citizen of the United States, residing in Springfield, county of Sangamon, and State of Illinois, have invented certain new and useful Improvements in Hay-Stackers, of which the following is a specification.

This invention relates to improvements in hay-stackers in which elevating-arms pivoted intermediate the ends thereof are provided for delivering the hay from the ground to the stack, and has for its prime object to provide such throwing-arms with an extensible section having hinged to the ends thereof an adjustable fork, whereby the angle of said fork teeth may be varied according to the adjustment of said extensible frame and without altering the angularity between the sets of fork-teeth.

Another object is to provide a stop device to one side of a vertical line drawn through the bearings of said arms and in the path of travel thereof, whereby the arm in its throw may pass beyond a vertical line, and consequently the pivotal point, so as to deliver the hay in the center of the stack at each throw of the arms.

Other objects are to have such stops of a yielding nature, so as to avoid a shock which would otherwise prove damaging to the machine, and to provide certain details of construction hereinafter described, and all as illustrated in the accompanying drawings, in which—

Figure 1 represents a perspective view of a stacker embodying my invention; Fig. 2, a side elevation thereof, the dotted lines showing the movements of the elevating-arms and the adjustability of the fork; Fig. 3, a detail sectional view showing the adjustment of the fork relatively to its supporting-arms, and Fig. 4, an enlarged detail transverse section through the counterbalance-weight.

Similar letters of reference indicate the same parts in the several figures of the drawings.

Referring by letter to the accompanying drawings, A indicates the supporting-frame of my stacker, consisting of an oblong ground-frame A', secured to and projecting upwardly from the side rails, of which about the center of the length thereof are the upright posts or standards B B, rigidly fixed in position by the inclined brace-bars B', extending between said posts and the ground-frame.

Loosely journaled on the tops of the posts B, and extending transversely across the machine, is a rock-shaft C, having secured thereto, near the ends thereof, the elevating-arms D D, extending longitudinally of the frame and connected by a suitable cross bar or bars forward of the rock-shaft and having their rear ends connected by a suitable box or receptacle D', in which are placed stones or any other weighty material for forming a counter-balance for equalizing the weight of the forward end of said elevating-arm. Sliding longitudinally on the free ends of the elevating-arms is an extension-frame E, composed of the longitudinal side bars E', of about an equal width with the elevating-arm and connected together and held rigidly in position by means of the cross-bars $E^2$ at a distance apart just sufficient to admit of the passage between them of the elevating-arms D, this construction thus constituting an adjustable sliding connection.

To the forward free ends of the side bars E' of the extension-frame is hinged or pivoted the fork F, of the usual construction of devices of this class, having pivoted to the cross-bar F' thereof, and extending transversely across the lower set of fork-teeth forward of the hinge, a depending curved plate G—one on each side thereof—having perforations G', through which passes a pin or bolt $D^2$, engaging the corresponding perforations in the arm E' of the extension-frame, as clearly illustrated in Fig. 3. The purpose of having this hinge-connection and adjustable fastening device between the fork and extension-frame is to permit the adjustment of the lower tines of the fork relative to the ground to compensate for the variations in the incline of the extension-frame when adjusted toward or away from the pivot of the elevating-arms, as illustrated by dotted lines in Fig. 2, the said frame being rigidly held at any point of its adjustment by means of a pin or bolt H, passing through the side arms of said frame and engaging any one of a series of corresponding perforations provided in the elevating-arms. To the rear ends of the elevating-arms are secured the cords or cables I, to the opposite ends of which is secured the draft-animal employed for tilting the said arms on their pivot-bearings, the said cords passing around a suitable pulley I', swiveled at the desired point on a stationary portion of the ground-frame of the stacker.

In order to give direction to the draft and proper leverage in starting to elevate the forward ends of the elevating-arms carrying the fork, I have provided the bars J, rigidly secured to and depending from the side of the elevating-arms D D, to the lower free end of which bars are secured suitable forks or prongs J', designed to straddle the draft-cords on each side of the machine, but only when the forward end of the elevating-arms are depressed, the object of which is to change the angle of strain or pull on the elevating-arm when at the limit of its movement toward the ground.

The forks J' engage the cord and force it out of a direct line between the pulley-blocks I' and the ends of the elevating-arm, so that the line of strain, instead of being almost parallel with the elevating-arms, is nearly at right angles thereto, thereby materially increasing the leverage thus obtained and rendering the work easier upon the draft-animals. These forks also leave the cord during the elevation of the arms, so as not in any manner to interfere with or interrupt the operation of the elevating-arms, but when the arms are again depressed these forks will automatically straddle and depress the cord in exactly the same manner as before described. It will be observed that when the fork reaches its extreme position it has passed some distance beyond a vertical line, so as to discharge its load at a short distance from the upright posts supporting the elevating-arms, and in order to permit this movement I have provided the laterally-projecting stops K, rigidly secured to and projecting at right angles a suitable distance from the rear ends of the elevating-arms, which stops come in contact with suitable springs K', secured to the post B, just before the arms have completed their throw, thereby relieving the said arms of the violent concussion which would occur should they come directly in contact with the posts.

The operation of the machine is as follows: When the load from the horse hay-rake has been deposited upon the fork, the draft-animal attached to the cord I is started forward, thereby drawing down or depressing the rear weighted end of the elevating-arms and producing a corresponding elevation of the forward ends of said arms, carrying with them the fork until the parts reach the position shown by dotted lines in Fig. 2, when the load from the fork is deposited upon the stack. The adjustable connection between the elevating-fork and the extension-frame of the elevating-arms is also of importance, because said arms are inclined when in their lowest position, and such connection permits a ready adjustment of the fork relative to the ground, so as to compensate for variations in the inclination of the elevating-arms due to the differing extended positions of said frame, and such a connection is further useful, owing to the rigid connection between the two sets of fork-teeth, as a result of which their relative positions are never changed nor their capacity or freedom of delivery altered by any variation of the position of the fork relative to the frame.

Having described my invention, what I claim, and desire to secure by Letters Patent, is—

1. In a hay-stacker, the elevating-arms, pivot-bearings therefor intermediate the ends thereof, and an extension-frame having a sliding connection with said arms, in combination with a hay-fork having opposing rigid teeth and a hinge or pivot connection between said fork and the extension-frame, substantially as described.

2. In a hay-stacker, the elevating-arms and the fork, the opposing sets of teeth of which are rigidly connected together, in combination with an extension-frame having an adjustable sliding connection with the elevating-arms and adjustable hinge-connection between said arms and the fork, substantially as described.

3. In a hay-stacker, the supporting-frame, the elevating-arms working between the sides of said frame, and bearings therefor intermediate the ends thereof, in combination with a stop for engaging said arms, located to one side of the vertical line struck through the bearings thereof, whereby said arms may pass beyond a vertical position and deposit their load in the center of the stack, substantially as described.

4. In a hay-stacker, the supporting-frame, the elevating-arms, and the pivot-bearing thereof, in combination with the stops projecting laterally and at a right angle from said arms and adapted and arranged to come in contact with a stationary portion of the supporting-frame, substantially as described.

5. In a hay-stacker, the supporting-frame, the elevating-arms, and the pivot-bearings intermediate the ends thereof, in combination with the stops projecting laterally and at a right angle from said arms, and a cushion or spring secured to a stationary portion of the frame in the path of said stops, substantially as described.

6. In a hay-stacker, the supporting-frame, the elevating-arms, the pivot-bearings intermediate the ends thereof, the swiveled pulleys secured to a stationary portion of the supporting-frame, and the draft-ropes secured to one end of the elevating-arms, adapted and arranged to work over said pulleys, in combination with the depending guide-bars secured to the elevating-arms intermediate the pivot and the draft end thereof, and forks or prongs secured to the free ends of said guide-bars, adapted to engage the draft-ropes intermediate the elevating-arms and the pulleys, substantially as described.

CHARLES W. POST.

Witnesses:
WILL R. OMOHUNDRO,
W. W. ELLIOTT.